United States Patent [19]
Weber et al.

[11] 3,777,490
[45] Dec. 11, 1973

[54] SUPERSONIC-COMBUSTION ROCKET
[75] Inventors: Richard J. Weber, Cleveland; Leo C. Franciscus, Lakewood, both of Ohio
[73] Assignee: The United States of America as represented by the Secretary of the National Aeronautics and Space Administration, Washington, D.C.
[22] Filed: Mar. 10, 1972
[21] Appl. No.: 233,519

[52] U.S. Cl. .................................. 60/258, 60/259
[51] Int. Cl. ........................................ F02k 9/02
[58] Field of Search ............... 60/258, 259, 39.48, 60/39.49, 39.12

[56] References Cited
UNITED STATES PATENTS
3,200,583 8/1965 Sobey et al. .......................... 60/259
3,570,249 3/1971 Baum et al. .......................... 60/259
2,936,577 5/1960 Amneus ................................ 60/258
2,408,111 9/1946 Truax et al. .......................... 60/259
3,178,885 4/1965 Loughran ....................... 60/39.48 X
2,558,483 6/1951 Goddard ..................... 60/39.49 UX

*Primary Examiner*—Carlton R. Croyle
*Assistant Examiner*—Robert E. Garrett
*Attorney*—N. T. Musial

[57] ABSTRACT

A supersonic combustion rocket is provided in which a small rocket motor is substituted for heavy turbo pumps in a conventional rocket engine. The substitution results in a substantial reduction in rocket engine weight. The flame emanating from the small rocket motor can act to ignite non-hypergolic fuels.

5 Claims, 3 Drawing Figures

SUPERSONIC-COMBUSTION ROCKET

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a liquid fuel rocket motor and specifically to a supersonic rocket motor having novel means for introducing the liquid propellant.

2. Description of the Prior Art

Conventional rocket motors utilize heavy turbopumps to transport liquid propellant components from their respective storage tanks to the combustion chamber. These pumps are heavy and complicated and present complex design problems. Additionally, extra propellant is required because of the weight of these pumps. The elimination of these pumps has therefore been a goal of engine designers. Unfortunately, no system has been developed which produces a decrease in weight without a corresponding decrease in the specific impulse of the rocket motor. For exmaple, when a pressure feed system is used, the resulting rocket has a lower specific impulse than the conventional rocket using the turbo pump feed system. Furthermore, much of the weight loss achieved by eliminating the pumps is counteracted by the increase in weight of the storage tanks necessary for pressurization. In U.S. Pat. No. 3,073,119, a feed system is disclosed in which one of the supply pumps is eliminated. This is accomplished by feeding one of the fuel components into the throat of an ejector. The inlet for the other component is connected to the suction side of the ejector. This second component is drawn into the combustion chamber as a result of the pressure differential between the throat and the second component inlet created by pumping the first fuel component into the ejector.

SUMMARY OF THE INVENTION

The object of the present invention is to reduce the weight of the conventional rocket motor.

Another object of the invention is to reduce engine weight by eliminating the heavy turbo pumps required in prior art conventional rocket motors without a corresponding reduction in specific impulse.

A further object of this invention is to provide a rocket motor in which the propellant is travelling at supersonic speeds in the combustion chamber when it is ignited.

These and other objects are accomplished by substituting a source of high velocity gas for the conventional turbo pumps utilized in rocket feed systems. This high speed gas source is preferably one which supplies gas at supersonic speed and in the preferred embodiment constitutes a small rocket motor. The small rocket motor is located between the fuel storage tank and the combustion chamber with its nozzle directed toward the latter. The high speed exhaust from the small rocket motor creates a pressure differential between the storage tanks and the exhaust stream which draws the fuel components from the storage tanks into the combustion chamber.

The supersonic combustion rocket of this invention comprises a nozzle means, a mixing chamber means, liquid propellant storage means, means operatively connecting storage and chamber means and a means for introducing a high velocity gas into said chamber means in a manner that a pressure differential is created between the storage means and the combustion chamber. This pressure differential causes the liquid propellant to flow from the storage tank means through the connecting means and into the chamber, with the liquid propellant becoming entrained in the gas stream. Preferably the means for introducing the high velocity gas is a small supersonic rocket motor having its nozzle directed toward the chamber.

In one embodiment the storage means includes a fuel and an oxidant storage tank. The connecting means includes first and second conduits connected to the oxidant and fuel storage tanks respectively, and to a third conduit. This third conduit is connected to the chamber means and contains the small rocket motor. Preferably the first and second conduits are connected to the third conduit upstream of the nozzle of the small rocket motor.

In a second embodiment the fuel and oxidant tanks are connected to the chamber by first and second conduits, respectively. A small rocket motor is positioned in each of the conduits.

In a third embodiment the oxidant and fuel storage tanks are operatively connected to the combustion chamber through first and second conduits. The small rocket motor is connected to the chamber in a position wherein the exhaust from the small rocket creates a pressure drop between each of the storage tanks and the combustion chamber.

DESCRIPTION OF THE PREFERRED EMBODIMENTS

Figure 1:
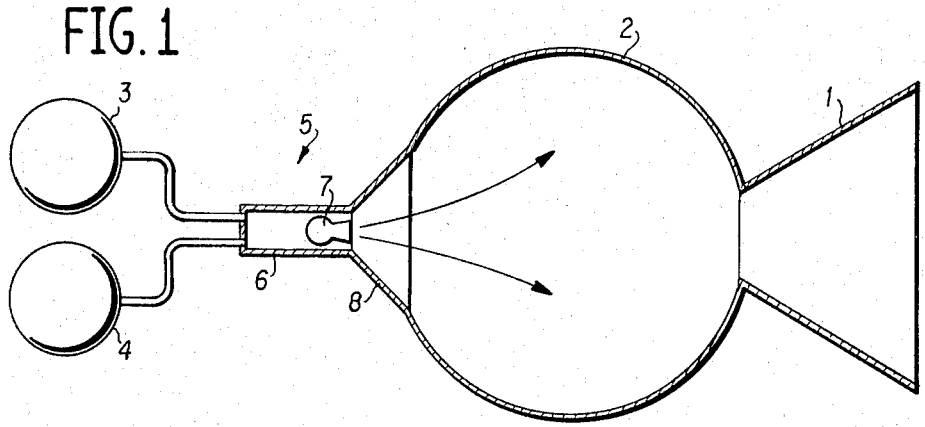
FIG. 1 is a schematic view of this invention using a single small rocket motor to inject a mixture of oxidizer and liquid fuel into the combustion chamber of the larger rocket motor.

FIG. 1 illustrates an embodiment of this invention which can be used for hypergolic or nonhypergolic propellants. The supersonic rocket motor includes the basic rocket motor elements, to wit, an exhaust nozzle 1, a combustion chamber 2, propellant storage tanks 3 and 4, and a fuel injection means 5. The injection means comprises the heart of the invention and includes a mixing conduit 6 and a source of high velocity gas, such as the small rocket motor 7 illustrated.

In operation the exhaust from the small rocket motor creates a pressure differential between the storage tanks and the exhaust stream in the mixing conduit 7 which causes the liquid fuel and liquid oxidant to flow from their respective storage tanks into the mixing conduit where they are entrained in the exhaust gases and then propelled into the combustion chamber at supersonic speeds. In the system illustrated in FIG. 1, the small rocket motor exhaust ignites the fuel mixture as it enters the combustion chamber. Alternatively, a separate pilot light, not shown, can be used to ignite the mixture if the exhaust gas temperature of the small rocket motor is below the ignition temperature.

Figure 2:
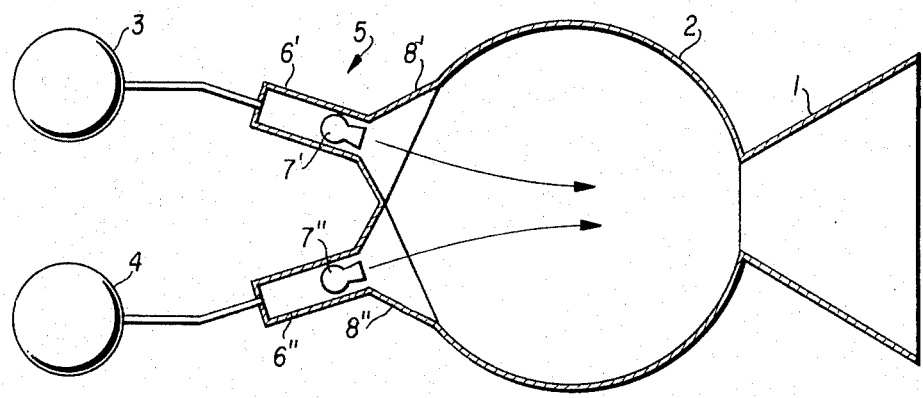
FIG. 2 is a schematic diagram of a second embodiment of this invention in which separate small rocket motors are used to inject the fuel and oxidizer into the combustion chamber.

FIG. 2 illustrates an embodiment of the invention which may be used for hypergolic fuel systems. Once again the same basic rocket components are present. These include the exhaust nozzle 1, the combustion chamber 2, the fuel and oxidant storage tanks 3 and 4 and the fuel injection system 5. Here the fuel injection system comprises two mixing conduits 6' and 6" and two small rocket motors 7' and 7". Downstream of the rocket motors two mixing zones 8' and 8" are provided.

In operation the fuel contained in tank 3 is drawn into the mixing conduit 6' by the pressure differential created by the exhaust stream from the rocket motor 7'. This component becomes entrained in the exhaust from the rocket in mixing zone 8'. In a like manner, the oxidant contained in tank 4 is intermixed with the exhaust from the rocket motor 7" in mixing zone 8". The two propellant components entrained in their respective small rocket motor exhausts are combined in combustion chamber 2 where they spontaneously ignite at supersonic speeds.

Figure 3:
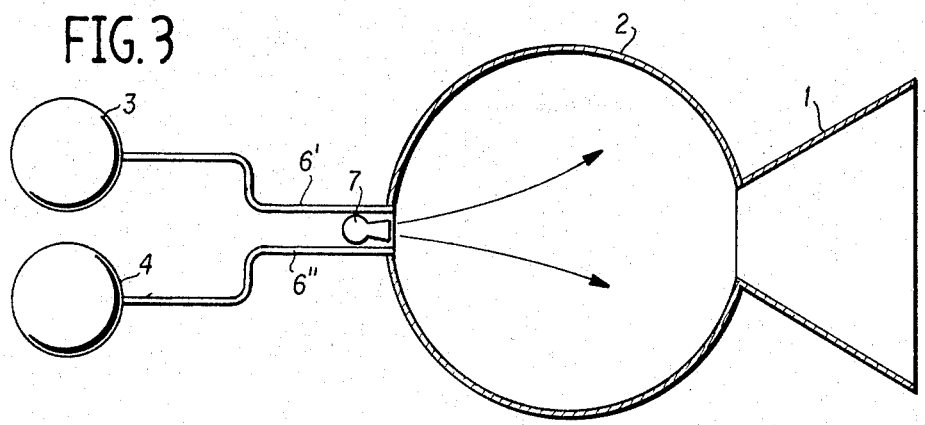
FIG. 3 illustrates a third embodiment of this invention in which a single small rocket motor is used to inject separate streams of fuel and oxidizer into the mixing chamber.

The embodiment of FIG. 3 is also useful in hypergolic fuel systems. A single small rocket motor is used to feed the oxidant and fuel components into the combustion chamber as in the embodiment of FIG. 1. However, unlike the embodiment of FIG. 1, the two propellant components do not intermix until they enter the combustion chamber as in the embodiment of FIG. 2. In operation of the rocket motor depicted in FIG. 3, the exhaust from the small rocket motor 7 creates a pressure differential between the storage tanks and the combustion chamber inlets which draw the propellant components from tanks 3 and 4 through conduits 6' and 6" respectively. The two streams emanating from these conduits simultaneously become entrained in the exhaust gases and intermix with each other thereby spontaneously igniting as they enter the combustion chamber 2.

The embodiments of FIGS. 2 and 3 can also be used for non-hypergolic fuels. In the FIG. 2 motor it may be necessary to provide a pilot light to ignite the fuel mixture. However, in the embodiment of FIG. 3 the exhaust gases from small rocket 7 may serve this function.

In designing the supersonic combustion rocket of FIG. 2, the various cross sectional flow areas are selected to achieve supersonic flow of the fuel components entering the combustion chamber. For the rockets of FIGS. 1 and 3, the propellants may be injected at subsonic or supersonic speeds. However, in all cases the burned mixture is to leave the combustor at supersonic speeds. The overall rocket should be designed in a manner that the various flow areas, wall contours and pressures yield maximum thrust and specific impulse. All of these parameters can be determined by those skilled in the rocket engine art.

The liquid propellant for the small rocket motor is provided through a conventional turbo pump feed system. Alternatively, as a result of the low chamber pressures required by the small rocket motor, a pressure feed system will provide satisfactory results. Generally, the propellant used for the small rocket motor will be the same as that used by the larger motor. However, it is also possible to use different fuel and oxidant combinations for the small and large motors. In the former case the same fuel storage tanks can be used to supply both engines. However, it is also possible to use separate storage tanks for both rockets.

The advantages of the supersonic combustion engine of this invention are clearly illustrated by the analytical results obtained using a liquid oxygen-liquid hydrogen propellant mixture in the embodiment of FIG. 3. Using a mixture ratio of liquid oxygen to liquid hydrogen of 8 and operating at a chamber pressure of 500 p.s.i. an exit mach number of 2.16 is obtained in the small motor with an area ratio of 2.45. Using a large rocket with a propellant flow about 10 times that of the small rocket and having a combustor area ratio of 56 with a liquid oxygen/liquid hydrogen mixture ratio of 8 the following exit conditions are obtained for the supersonic combustion rocket: A combustor exit pressure of 0.83 p.s.i.; a temperature of 3,500°R.; a velocity of 13,800 feet per second; and a mach number of 4.2. The vacuum specific impulse of this supersonic combustion rocket is 470 seconds if the exhaust gases are expanded to 0.15 p.s.i. Thus a small rocket which delivers 15,000 pounds of thrust results in a supersonic combustion rocket having a total vacuum thrust computed to be 230,000 pounds. This large thrust is achieved with a substantial reduction in rocket weight since the only turbo pumps used are those necessary for the small rocket motor which are significantly lighter than the pumps necessary for a conventional motor having 230,000 pounds of thrust.

The throat area between the chamber 2 and the nozzle 1 may be proportionately larger than that shown in FIGS. 1, 2 and 3 and is large enough so that sonic flow from the chamber to the nozzle is avoided. As is known to those skilled in the art, sonic flow in the throat of a rocket motor tends to create excessive heating in that area. Advantageously, since the exhaust flow from the rocket motor embodying the invention is already at supersonic speed, no necked-down throat between the chamber and the nozzle is required to produce supersonic velocity of the exhaust as in the prior art.

What is claimed is:

1. In a rocket motor comprising a nozzle means communicating with a mixing chamber means, liquid propellant storage means, and means operatively connecting said storage means and said chamber means, a small supersonic rocket motor means for introducing a high velocity gas stream into said chamber means, said small rocket having a nozzle directed toward said chamber means and communicating therewith whereby a pressure differential is created between said storage means and said chamber means, whereby the liquid propellant is caused to flow from said storage tank through said connecting means into said chamber means, throat means disposed between said chamber and said nozzle means, said throat being sufficiently large to avoid sonic flow in the throat area, said liquid propellant becoming entrained in the high velocity gas stream then burning and leaving said chamber at supersonic velocity.

2. The rocket motor of claim 1 wherein said liquid propellant storage means comprises an oxidant storage tank and a fuel storage tank, said connecting means comprises first and second conduits connected to said oxidant and fuel storage tanks respectively, a third conduit connected at one end to said chamber means, and means connecting said first and second conduits to said third conduit, said small rocket motor being positioned in said third conduit.

3. The rocket motor of claim 2 wherein said means connecting said first and second conduits to said third conduit is located upstream of the nozzle of said small rocket motor.

4. The rocket motor of claim 1 wherein said liquid propellant storage means comprises an oxidant storage tank and a fuel storage tank, said connection means comprises a first and second conduit means connecting said oxidant and fuel storage tanks to said chamber means, respectively, said small motor means comprising first and second small rocket motors located in said first and second conduit means, respectively.

5. The rocket motor of claim 1 wherein said liquid propellant storage means comprises an oxidant storage tank and a fuel storage tank, said conduit means comprises first and second conduits connecting said oxidant and fuel storage tanks respectively to said chamber, and means connecting said small rocket means to said chamber in a position wherein the exhaust from said small rocket creates a pressure drop between each of said storage tanks and said chamber.

* * * * *